(12) United States Patent
Saporta et al.

(10) Patent No.: US 10,810,778 B2
(45) Date of Patent: *Oct. 20, 2020

(54) METHOD AND SYSTEM FOR GENERATING A 360-DEGREE PRESENTATION OF AN OBJECT

(71) Applicant: Augmented Reality Concepts, Inc., Syracuse, NY (US)

(72) Inventors: Steven Saporta, Millburn, NJ (US); Collin Stocks, New York, NY (US); Devin Daly, Tully, NY (US); Michael Quigley, Syracuse, NY (US)

(73) Assignee: Augumented Reality Concepts, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,279

(22) Filed: May 6, 2020

(65) Prior Publication Data

US 2020/0265625 A1    Aug. 20, 2020

Related U.S. Application Data

(63) Continuation of application No. 16/683,902, filed on Nov. 14, 2019, now Pat. No. 10,672,169, which is a continuation of application No. 16/413,701, filed on May 16, 2019, now Pat. No. 10,672,106, which is a continuation of application No. 15/804,864, filed on Nov. 6, 2017, now Pat. No. 10,332,295, which is a continuation of application No. 14/552,826, filed on Nov. 25, 2014, now Pat. No. 9,865,069.

(51) Int. Cl.
| | |
|---|---|
| *G09G 5/00* | (2006.01) |
| *G06T 11/60* | (2006.01) |
| *G06T 3/40* | (2006.01) |
| *G06Q 30/06* | (2012.01) |
| *G06Q 30/02* | (2012.01) |

(52) U.S. Cl.
CPC .......... *G06T 11/60* (2013.01); *G06Q 30/0643* (2013.01); *G06T 3/40* (2013.01); *G06T 3/4038* (2013.01); *G06Q 30/0276* (2013.01)

(58) Field of Classification Search
CPC ................................ G06T 3/40; G06T 11/60
See application file for complete search history.

(56) References Cited

U.S. PATENT DOCUMENTS

| | | |
|---|---|---|
| 6,134,564 A | 10/2000 | Listou |
| 7,882,258 B1 | 2/2011 | Sumler |
| 8,353,406 B2 | 1/2013 | Sumler |

(Continued)

*Primary Examiner* — Charles Tseng
(74) *Attorney, Agent, or Firm* — Mintz, Levin, Cohn, Ferris, Glovsky and Popeo, P.C.; Pedro Suarez; Paul Brockland

(57) ABSTRACT

Methods and systems for generating an interactive rotatable 360-degree presentation of an object are disclosed. The methods and systems obtain data describing the object, where the data includes information about a number of images of the object, as well as additional information about the object. The images are automatically obtained and rearranged into at least one sequence of images substantially evenly distributed around 360 degrees. It is determined whether to add hotspot(s) to image(s), and if hotspot(s) are to be added, the hotspot(s) are automatically added to the image(s). The ordered images of the sequence(s) are then merged into an interactive rotatable 360-degree presentation of the object.

20 Claims, 12 Drawing Sheets

(56) References Cited

U.S. PATENT DOCUMENTS

| | | |
|---|---|---|
| 8,503,826 B2 | 8/2013 | Klimenko |
| 9,865,069 B1 | 1/2018 | Saporta |
| 2002/0085219 A1 | 7/2002 | Ramamoorthy |
| 2003/0103065 A1 | 6/2003 | Masera |
| 2014/0152806 A1 | 6/2014 | Hauk |

METHOD AND SYSTEM FOR GENERATING A 360-DEGREE PRESENTATION OF AN OBJECT

CROSS-REFERENCE TO RELATED APPLICATIONS

This application is a continuation of U.S. application Ser. No. 16/683,902 filed on Nov. 14, 2019 which is a continuation of U.S. application Ser. No. 16/413,701 filed May 16, 2019 which is a continuation of U.S. application Ser. No. 15/804,864, filed on Nov. 6, 2017, which is a continuation of U.S. application Ser. No. 14/552,826, filed on Nov. 25, 2014, and titled "Method And System For Generating A 360-Degree Presentation Of An Object," each of which are herein incorporated by reference in their respective entirety.

BACKGROUND OF THE INVENTION

Many businesses want to use rotating images of their products to advertise the products to potential consumers, allowing the potential customers to see more of the product than simple stationary pictures offer. Because the creation of rotating images is a complex process, not readily performed by typical business personnel, there is a need for an automated method or system that can create interactive 360-degree presentations of a business' products from two-dimensional pictures of the products.

SUMMARY OF THE INVENTION

Embodiments of the present invention include a computer-implemented method for generating an interactive rotatable 360-degree presentation of an object. The method includes obtaining data describing the object, where the data includes information about a plurality of images of the object to be obtained and converted into the interactive rotatable 360-degree presentation of the object, as well as additional information about the object. Such a presentation includes at least one view of the object (for example, an exterior view or an interior view). The plurality of images of the object are automatically obtained, and the plurality of images are rearranged into a sequence for each view. A sequence includes ordered images from a plurality of viewing angles of the object substantially evenly distributed around 360 degrees. The process automatically determines whether to add at least one hotspot (an element associated with a separate media element) and enable access to the media element when selected by a viewer of the interactive rotatable 360-degree presentation to image(s) in the sequence, and if hotspot(s) are to be added, the hotspot(s) are automatically added to the image(s). The process then merges the ordered images of the at least one sequence into at least one view, and merges the at least one view into an interactive rotatable 360-degree presentation of the object.

In many embodiments, the data describing the object are contained in a record that includes a plurality of data arranged in rows and columns, each row corresponding to a different object. In this case, obtaining the data describing the object involves determining which columns of the plurality of data include information about images of the object to be obtained. Obtaining the data also involves determining which columns of the plurality of data include the additional information about the object and which row of the plurality of data corresponds to the object. In such an embodiment, determining which row corresponds to the object may include, for each row, comparing data contained in the columns of the row with predetermined criteria.

In some embodiments, obtaining the plurality of images of the object includes obtaining them from a source that is separate from the source of the data describing the object. Such a source may be specified by the information about the plurality of images. The images may also be resized such that the images are an appropriate size for the interactive rotatable 360-degree presentation.

In some embodiments, rearranging the plurality of images into a sequence involves determining the order for the images based on predetermined information corresponding to the object or a source of the object. Part of the predetermined information may be expressed in a notation describing which images from the plurality of images should be included in the sequence and in which order.

In many embodiments, rearranging the images into a sequence includes selecting images that correspond to an exterior view of the object for inclusion in one sequence, and selecting images that correspond to an interior view of the object for inclusion in an additional sequence. In such embodiments, merging the images of the sequence(s) includes merging the ordered images of the sequence including exterior images into an interactive rotatable 360-degree exterior view of the object, and merging the ordered images of the additional sequence including interior images into an interactive rotatable 360-degree interior view of the object.

In some embodiments, adding hotspot(s) to the image(s) includes determining a position for the hotspot(s) on each of the images and/or determining the separate media element based on predetermined information corresponding to the object or the source of the object. The separate media element may be text, an additional image, a video, a web page link, or an additional interactive rotatable 360-degree presentation. In further embodiments, the hotspot(s) may be added if and only if the additional information about the object (from the data describing the object) meets certain predetermined criteria.

A system for implementing the above method(s) may include at least an interface and a processor. The interface (e.g., internet connection or removable media) obtains data describing the object and obtains a plurality of images of the object, and may further allow the definition of settings that control how data describing the object and images are obtained and processed. The processor automatically rearranges the plurality of images into at least one sequence of ordered images from a plurality of viewing angles of the object substantially evenly distributed around 360 degrees. The processor further determines whether to add at least one hotspot to at least one image in the at least one sequence, and if the at least one hotspot is to be added, automatically adds the at least one hotspot to the at least one image. The processor merges the ordered images of the at least one sequence into at least one view, and merges the at least one view into an interactive rotatable 360-degree presentation of the object.

BRIEF DESCRIPTION OF THE DRAWINGS

The foregoing will be apparent from the following more particular description of example embodiments of the invention, as illustrated in the accompanying drawings in which like reference characters refer to the same parts throughout the different drawings. The drawings are not necessarily to scale, emphasis instead being placed upon illustrating embodiments of the present invention.

DETAILED DESCRIPTION

A description of example embodiments of the invention follows.

Embodiments of the present invention create a photorealistic, interactive rotatable 360-degree presentation of an object suitable for display on a computer or mobile device, and allow users without technical knowledge to create such presentations from their own photographs/images. As used herein, the terms "photograph," "photo," "picture," and "image" refer to digital images capable of being processed by a computer. Systems for creating such presentations may include a creator component that automates the creation of interactive rotatable 360-degree presentations based on data and photographs provided by a user; an integrator component that can automate the insertion of the presentation into pages of the user's website; and a manager component that allows users to manage account settings and existing presentations. One advantage of the disclosed embodiments is the ability of users to create their own interactive rotatable 360-degree presentations, in contrast to other service-bureau systems. Another advantage is that a single interactive rotatable 360-degree presentation can display any of multiple rotating 360-degree views of an object, which is particularly useful when the object being displayed is an automobile where the views can include exterior and interior views. Another advantage is that specific features of the object can be highlighted (e.g., with demarcations called "hotspots"). For each highlighted feature, the interactive rotatable 360-degree presentation can display one or more hotspots on its images. When a viewer selects (e.g., clicks or taps) a hotspot, the interactive rotatable 360-degree presentation displays the creator's choice of a text message, close-up image, web page, or additional interactive rotatable 360-degree presentation, for example. Such hotspots automatically follow the appropriate point on the interactive rotatable 360-degree presentation as the presentation rotates. Hotspots can be created by nontechnical personnel or can be automatically created with little or no action by the user.

Figure 1:
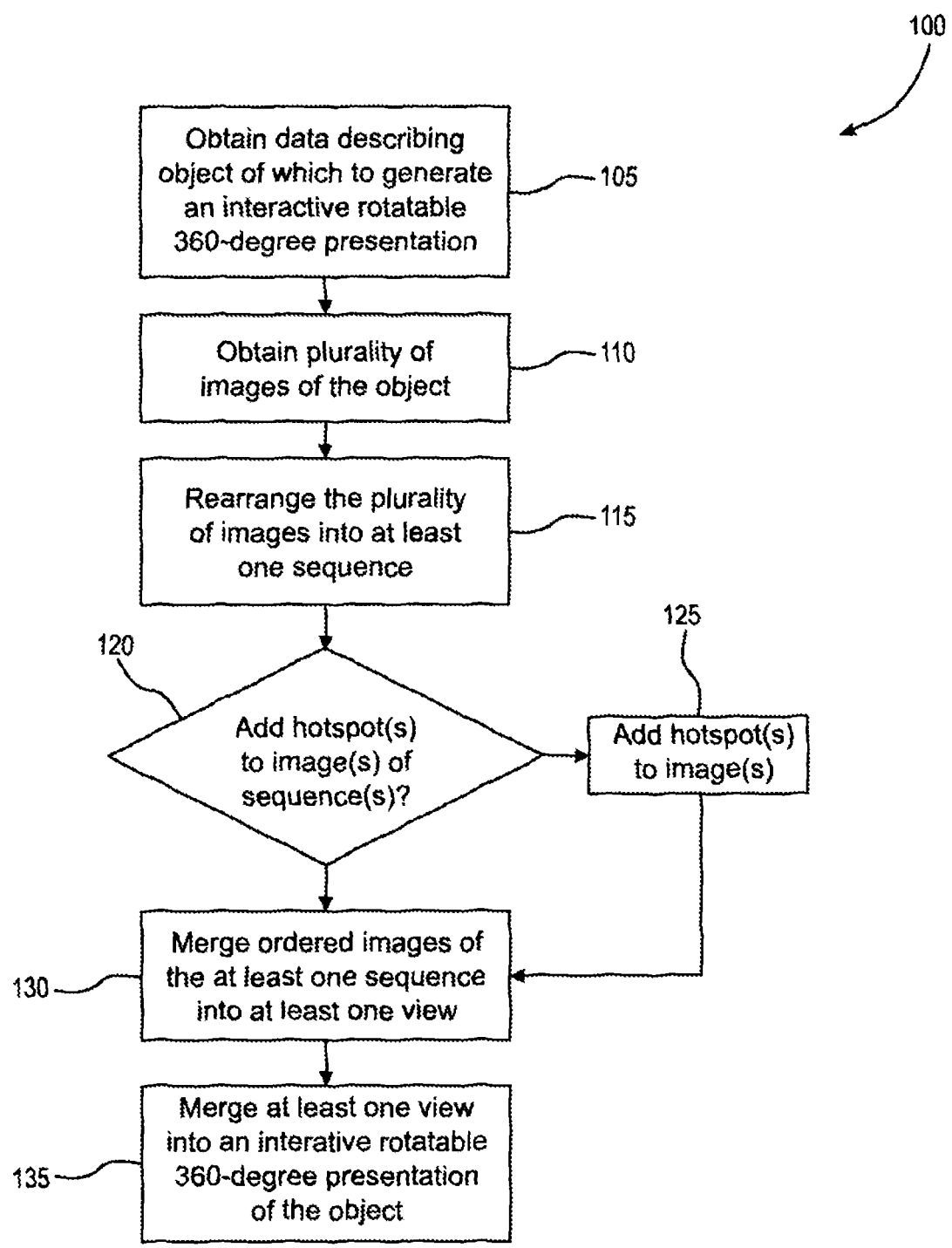
FIG. 1 is a flow diagram illustrating a method for generating an interactive rotatable 360-degree presentation of an object, according to an example embodiment of the present invention.

FIG. 1 is a flow diagram illustrating a method 100 for generating an interactive rotatable 360-degree presentation of an object, according to an example embodiment of the present invention. The illustrated method 100 includes obtaining (105) data describing the object, where the data includes information about a plurality of images of the object to be obtained and converted into the interactive rotatable 360-degree presentation of the object, as well as additional information about the object. The process automatically obtains (110) the plurality of images of the object and rearranges (115) the plurality of images into at least one sequence, where the sequence includes ordered images from a plurality of viewing angles of the object substantially evenly distributed around 360 degrees. The process automatically determines (120) whether to add at least one hotspot (an element associated with a separate media element and enabling access to the media element when selected by a viewer of the interactive rotatable 360-degree presentation of the object) to image(s) in the sequence(s), and if a hotspot is to be added, the process automatically adds (125) the hotspot(s) to the image(s). The process then merges (130) the ordered images of the at least one sequence into at least one view, and merges (135) the at least one view into an interactive rotatable 360-degree presentation of the object.

A user (e.g., a business, such as a car dealer) that uses the disclosed methods or systems may also use the services of one of several service bureaus known as "feed providers." A feed provider stores and transmits data about the user's products (e.g., stock of vehicles for a car dealer), including digital photos uploaded by the user's photographer. In the case of a car dealer, the feed provider makes the vehicle data for that particular car dealer, including links to downloadable copies of the photos, available in a "feed file," typically in a comma-separated values (CSV) format. The disclosed methods and systems periodically receive updated feed files from the feed provider for the particular user.

The format of the feed file may vary among users (e.g., car dealers). For each user, the disclosed methods and systems must determine which columns of the feed file are of interest. This determination is often made when initiating interaction with a new user (e.g., car dealer) of the method/system. On a recurring basis, each time the embodiments of the present invention receive updated feed files from the feed provider, it is necessary to determine the relevant columns/rows of the feed file and extract the relevant data from those columns/rows. The present embodiments include an automated procedure to do so, an example of which is described below.

Excerpts from two user's feed files are shown in the below tables, each user being a car dealer. In each case, a header row that specifies column names is followed by multiple rows of data, each representing one vehicle. The columns that are included and how the columns are named varies from user to user (e.g., from dealer to dealer in the case of car dealers). For example, User #1 indicates whether a vehicle is new or used, while User #2 does not, and User #1 provides photo Uniform Resource Locators (URLs) in a column named ImageURL, while User #2 names the column PictureURLs.

TABLE 1

Example Feed File for User #1

| Used New | Year | Make | Model | Trim | Body Style | Stock Number | VIN | Invoice |
|---|---|---|---|---|---|---|---|---|
| U | 2012 | Volvo | S60 | T6 | Sedan | C2044795 | YV1902FH | 43041 |
| U | 2010 | Volvo | S80 | V8 | Sedan | A1122388 | YV1852AR | 50512 |
| U | 2012 | Volvo | S60 | T5 | Sedan | C2080415 | YV1622FS | 34612 |
| U | 2012 | Volvo | XC60 | 3.2 Premier | SUV | C2268880 | YV4940DZ | 39722 |
| U | 2012 | Volvo | XC90 | 3.2 | SUV | C1622456 | YV4952CZ | 44286 |
| U | 2012 | Volvo | XC90 | 3.2 | SUV | C1620042 | YV4952CZ | 40620 |
| U | 2012 | Volvo | S60 | T6 | Sedan | C2118828 | YV1902FH | 42876 |
| U | 2012 | Volvo | S60 | T6 R-Design | Sedan | C2095318 | YV1902FH | 49212 |
| U | 2012 | Volvo | XC60 | T6 Premier | SUV | C2303987 | YV4902DZ | 42307 |
| U | 2012 | Volvo | XC70 | 3.2 | Wagon | C1130666 | YV4940BZ | 39175 |
| U | 2013 | Volvo | XC60 | T6 R-Design | SUV | D2380541 | YV4902DZ | 48724 |
| U | 2013 | Volvo | XC60 | T6 Platinum | SUV | D2386786 | YV4902DZ | 47089 |
| U | 2013 | Volvo | S60 | T5 | Sedan | D2188834 | YV1612FH | 36373 |
| U | 2013 | Volvo | S60 | T5 Premier | Sedan | D2199113 | YV1612FH | 35997 |
| U | 2013 | Volvo | S60 | T5 Premier | Sedan | D1208658 | YV1612FS | 0 |
| U | 2011 | Volvo | XC60 | T6 | SUV | B2211385 | YV4902DZ | 0 |
| U | 2011 | Volvo | XC90 | 3.2 R-Design | SUV | B1593957 | YV4952CT | 0 |
| U | 2014 | Volvo | XC60 | T6 | SUV | BE2545935 | YV4902FZ | 41558 |
| U | 2014 | Volvo | XC90 | 3.2 Preimuer | SUV | E1686975 | YV4952CZ | 43866 |
| U | 2013 | Volvo | S60 | T5 Premier | Sedan | D2225850 | YV1612FH | 0 |

| Image URLs | Certified | Model Code | Auto ID | Internet Special | Inventory Date | Carfax One |
|---|---|---|---|---|---|---|
| http://edg | N | S60T6 | 8194216 | Y | Mar. 5, 2014 | Y |
| http://edg | N | S80V8 | 8194231 | Y | Dec. 14, 2009 | N |
|  | N | S60T5 | 8194247 | N | Sep. 2, 2014 | Y |
| http://edg | N | XC6032P | 8428464 | Y | Sep. 13, 2013 | Y |
| http://edg | N | XC9032 | 8428467 | Y | Jul. 2, 2014 | Y |
|  | N | XC9032 | 8962660 | N | Sep. 9, 2014 | Y |
|  | N | S60T6 | 8232172 | N | Sep. 3, 2014 | Y |
| http://edg | Y | S60T6 | 9292806 | Y | Feb. 7, 2012 | Y |
| http://edg | Y | XC60T6PP | 9321694 | Y | Apr. 15, 2014 | Y |
|  | N | XC70AWD | 10118061 | N | Sep. 4, 2014 | Y |
| http://edg | N | XC60T6PT | 11061759 | Y | Jul. 23, 2012 | N |
| http://edg | N | XC60T6PT | 11562856 | Y | Sep. 5, 2012 | N |
| http://edg | N | S60T5AWD | 11795014 | Y | Jun. 28, 2014 | Y |
| http://edg | N | S60T5P | 12573906 | Y | Nov. 28, 2012 | Y |
| http://edg | N | S60T5P | 13839777 | Y | Mar. 7, 2013 | Y |
| http://edg | N | XC60 | 13896673 | Y | Mar. 11, 2013 | Y |
| http://edg | N | XC90AWD | 14025691 | Y | Mar. 28, 2011 | Y |
|  | N | XC60T6 | 18266050 | N | Sep. 9, 2014 | Y |
| http://edg | N | XC9032PP | 18266116 | N | Dec. 20, 2013 | N |
| http://edg | N | S60T5P | 18504675 | Y | Jan. 10, 2014 | Y |

TABLE 2

Example Feed File for User #2

| Dealer ID | VIN | Stock Number | Year | Make | Model | Inventory Since | Picture URLs | Options | CARFAX |
|---|---|---|---|---|---|---|---|---|---|
| 7763 | 19XFB2F53 | CE307872 | 2012 | Honda | Civic | Aug. 30, 2014 0:00 | http://images.auction123.com/114b3b95-ba50-41e7-b0e3-117e85255b86/19XF | Honda Cer | CARFAX X |
| 7763 | 19XFB2F56 | CE308238 | 2012 | Honda | Civic | Jul. 22, 2014 0:00 | http://images.auction123.com/114b3b95-ba50-41e7-b0e3-117e85255b86/19XF | Honda Cer | CARFAX X |
| 7763 | 19XFB2F9X | CE325353 | 2012 | Honda | Civic | Aug. 25, 2014 0:00 | http://images.auction123.com/114b3b95-ba50-41e7-b0e3-117e85255b86/19XF | Honda Cer | CARFAX X |
| 7763 | 1HGCP2F3 | CA054896 | 2012 | Honda | Accord | Aug. 30, 2014 0:00 | http://images.auction123.com/114b3b95-ba50-41e7-b0e3-117e85255b86/1HGO | Honda Cer | CARFAX X |
| 7763 | 1HGCP2F3 | CA176717 | 2012 | Honda | Accord | Jul. 15, 2014 0:00 | http://images.auction123.com/114b3b95-ba50-41e7-b0e3-117e85255b86/1HGO | Honda Cer | CARFAX X |
| 7763 | 1HGCP2F3 | CA088843 | 2012 | Honda | Accord | Aug. 30, 2014 0:00 | http://images.auction123.com/114b3b95-ba50-41e7-b0e3-117e85255b86/1HGO | Honda Cer | CARFAX X |
| 7763 | 1HGCP2F3 | CA093072 | 2012 | Honda | Accord | Aug. 30, 2014 0:00 | http://images.auction123.com/114b3b95-ba50-41e7-b0e3-117e85255b86/1HGO | Honda Cer | CARFAX X |
| 7763 | 1HGCP2F4 | CA235274 | 2012 | Honda | Accord | Aug. 25, 2014 0:00 | http://images.auction123.com/114b3b95-ba50-41e7-b0e3-117e85255b86/1HGO | Honda Cer | CARFAX X |
| 7763 | 1HGCP2F6 | CA205737 | 2012 | Honda | Accord | Jul. 1, 2014 0:00 | http://images.auction123.com/114b3b95-ba50-41e7-b0e3-117e85255b86/1HGO | Honda Cer | CARFAX X |
| 7763 | 1HGCP2F6 | CA181250 | 2012 | Honda | Accord | Aug. 25, 2014 0:00 | http://images.auction123.com/114b3b95-ba50-41e7-b0e3-117e85255b86/1HGO | Honda Cer | CARFAX X |

TABLE 2-continued

Example Feed File for User #2

| Dealer ID | VIN | Stock Number | Year | Make | Model | Inventory Since | Picture URLs | Options | CARFAX |
|---|---|---|---|---|---|---|---|---|---|
| 7763 | 1HGCP2F6 | CA059542 | 2012 | Honda | Accord | Aug. 19, 2014 0:00 | http://images.auction123.com/114b3b95-ba50-41e7-b0e3-117e85255b86/1HGO | Honda Cer | CARFAX X |
| 7763 | 1HGCP2F8 | CA005706 | 2012 | Honda | Accord | Aug. 30, 2014 0:00 | http://images.auction123.com/114b3b95-ba50-41e7-b0e3-117e85255b86/1HGO | Honda Cer | CARFAX X |
| 7763 | 1HGCP3F8 | BA032011 | 2011 | Honda | Accord | Aug. 28, 2014 0:00 | http://images.auction123.com/114b3b95-ba50-41e7-b0e3-117e85255b86/1HGO | Honda Cer | CARFAX X |
| 7763 | 1HGCP3F8 | CA035330 | 2012 | Honda | Accord | Jun. 23, 2014 0:00 | http://images.auction123.com/114b3b95-ba50-41e7-b0e3-117e85255b86/1HGO | Honda Cer | CARFAX X |
| 7763 | 1HGCR2F3 | DA004152 | 2013 | Honda | Accord | Aug. 28, 2014 0:00 | http://images.auction123.com/114b3b95-ba50-41e7-b0e3-117e85255b86/1HGO | Honda Cer | CARFAX X |
| 7763 | 1HGCR2F5 | DA250188 | 2013 | Honda | Accord | Aug. 29, 2014 0:00 | http://images.auction123.com/114b3b95-ba50-41e7-b0e3-117e85255b86/1HGO | Honda Cer | CARFAX X |
| 7763 | 1HGCS1B3 | BA014395 | 2011 | Honda | Accord | Jul. 29, 2014 0:00 | http://images.auction123.com/114b3b95-ba50-41e7-b0e3-117e85255b86/1HGO | Honda Cer | CARFAX X |
| 7763 | 1HGCS1B7 | CA000345 | 2012 | Honda | Accord | Aug. 30, 2014 0:00 | http://images.auction123.com/114b3b95-ba50-41e7-b0e3-117e85255b86/1HGO | Honda Cer | CARFAX X |
| 7763 | 1HGCS1B7 | BA016170 | 2011 | Honda | Accord | Aug. 25, 2014 0:00 | http://images.auction123.com/114b3b95-ba50-41e7-b0e3-117e85255b86/1HGO | Honda Cer | 2 Owners |

A sample feed file for a particular user (e.g., car dealer) may be used to determine which columns are of interest in a feed file for that user and to create a configuration record for that user. One method of making the initial determination is to inspect the sample feed file and examine the feed file's header row, determining the names of the columns, if provided, that represent a vehicle's VIN, stock number, date (including date format), make, model, and photo URLs, for example. A subset of the columns may be used for filtering the products (e.g., vehicles) for that particular user (e.g., car dealer) listed in feed files for the user. A configuration record is then created for that user, to be used when processing feed files for the user. The following example algorithm may be used when extracting the relevant data from the relevant columns/rows of a feed file.

```
-- Extraction Algorithm --
read vin_column_name from config record
read stock_column_name from config record
read make_column_name from config record
read model_column_name from config record
read photos_column_name from config record
read filter_column_name from config record
read filter_column_name_2 from config record
read date_column_name from config record
read filter_value from config record
read filter_value_2 from config record
read date_format from config record
read min_date from config record
vin_column_num = -1
stock_column_num = -1
make_column_num = -1
model_column_num = -1
photos_column_num = -1
filter_column_num = -1
filter_column_num_2 = -1
date_column_num = -1
first_row = true
for row in feed_file:
        if first_row:
                first_row = false
                for i = 0 to number of columns in row:
        if row[i] == vin_column_name:
vin_column_num = i
        if row[i] == stock_column_name:
stock_column_num = i
        if row[i] == make_column_name:
make_column_num = i
        if row[i] == model_column_name:
```

```
model_column_num = i
        if row[i] == photos_column_name:
photos_column_num = i
        if row[i] == filter_column_name:
filter_column_num = i
        if row[i] == filter_column_name_2:
filter_column_num_2 = i
        if row[i] == date_column_name:
date_column_num = i
        if row[i] == vin_column_name:
vin_column_num = i
                else:
skip = false
vin = row[vin_column_num]
if stock_column_name == -1:
        stock = ''
else:
        stock = row[stock_column_num]
photos = row [photos_column_num]
if filter_column_num == -1:
        filter1 = ''
else:
filter1 = row[filter_column_num]
if filter_column_num_2 == -1:
        filter2 = ''
else:
filter2 = row[filter_column_num_2]
if date_column_num == -1:
        date = ''
else:
        date = row[date_column_num]
if vin in master list of excluded vins:
        skip = true
if not skip:
        if vin in customer's list of excluded vins:
                skip = true
        if not skip:
                if filter_column_num != -1:
                        if row[filter_column_num] != filter_value:
                                skip = true
                if not skip:
                        if filter_column_num_2 != -1:
                                if row[filter_column_num_2] != filter_value_2:
                                        skip = true
                        if not skip:
                                if date_column_num != -1:
                                        if row[date_column_num] < min_date:
                                                skip = true
```

```
            if not skip:
                if vin has been previously processed:
                    if row has not changed since vin was last processed:
                        skip = true
                    if reprocessing is disabled:
                        skip = true
            if not skip:
                if number of photos < minimum number of photos required:
                    skip = true
            if not skip:
                process this vin
-- End Extraction Algorithm --
```

The configuration record for a particular user (e.g., car dealer) may include a definition of a particular sequence in which the exterior, interior, and other (e.g., close-up) images, provided by the user via the feed file, are arranged. The particular sequence may be defined using sequence strings, which specify the order of photos for either the exterior view, the interior view, or close-up images. Each sequence string follows a sequence grammar, an example of which is described below. A sequence string consists of one or more substrings separated by spaces, for example. A substring may be in one of the following forms (Table 3), where m and n are integers:

TABLE 3

Example Sequence Grammar

| Substring | Interpretation |
|---|---|
| n | The nth photo |
| :n | The first through the nth photo |
| n: | The nth photo through the last photo |
| m:n | The mth photo through the nth photo |

The sequences may be modified by qualifiers, such as "~" and "−". A tilde (~) may mean to reverse a sequence. For example, "~m:n" may represent the nth through the mth photo. A minus sign (−) may mean to count from the end of the sequence. For example, "−3" could mean the third-to-last photo. This capability is advantageous, because the total number of photos is not always known in advance.

Consider a user-provided photo set consisting of images. The following are some example sequences according to the above grammar:

"3 5 6:10"=images 3, 5, 6, 7, 8, 9, 10
"3 5 ~6:10"=images 3, 5, 10, 9, 8, 7, 6
":5"=images 1, 2, 3, 4, 5
"16:"=images 16, 17, 18, 19, 20
"−3:"=images 18, 19, 20

Figure 2:
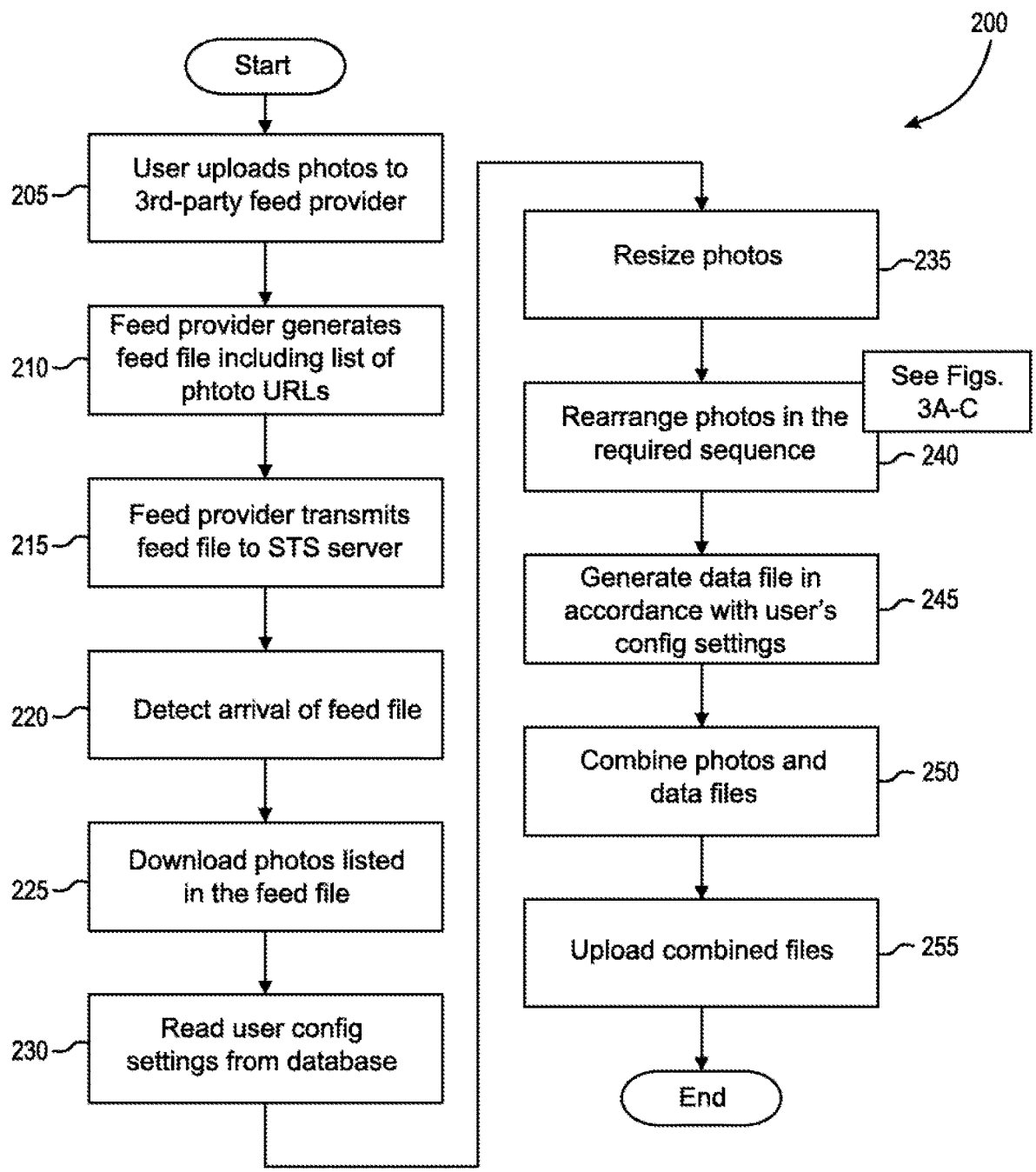
FIG. 2 is a flow diagram illustrating a method for generating an interactive rotatable 360-degree presentation of an object, according to an example embodiment of the present invention.

FIG. 2 is a flow diagram illustrating a method for generating an interactive rotatable 360-degree view of an object, according to an example embodiment of the present invention. The illustrated method 200 is similar to the method 100 of FIG. 1, but includes optional additional and/or related processes. According to the example method 200, a user uploads (205) photos of an object to a third-party feed provider. The feed provider generates (210) a feed file for that user that includes a list of photo URLs. The feed provider transmits (215) the feed file to a server. The present embodiments then detect (220) the arrival of the feed file, download (225) the photos listed in the file, and read (230) user configuration settings for the user. The example method 200 may then resize (235) the photos and rearrange (240) the photos in a particular sequence. A data file is then generated (245) in accordance with the user's configuration settings and combined (250) with the photos. The combined files are then uploaded (255) as an interactive rotatable 360-degree presentation.

Figure 3A:
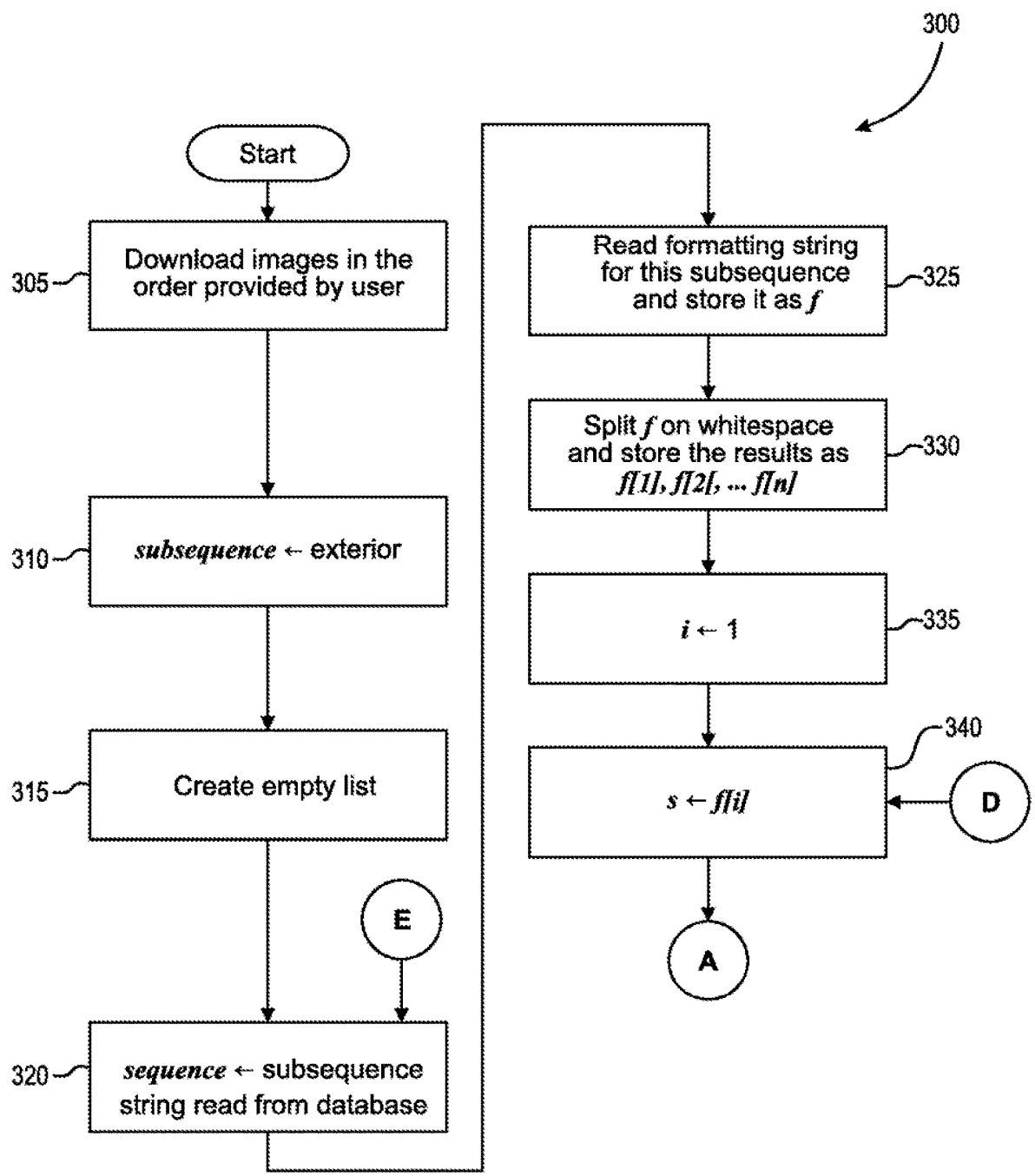
FIGS. 3A-3C are flow diagrams illustrating automatically rearranging a plurality of images into at least one sequence that includes ordered images from a plurality of viewing angles, according to an example embodiment of the present invention.
Figure 3B:
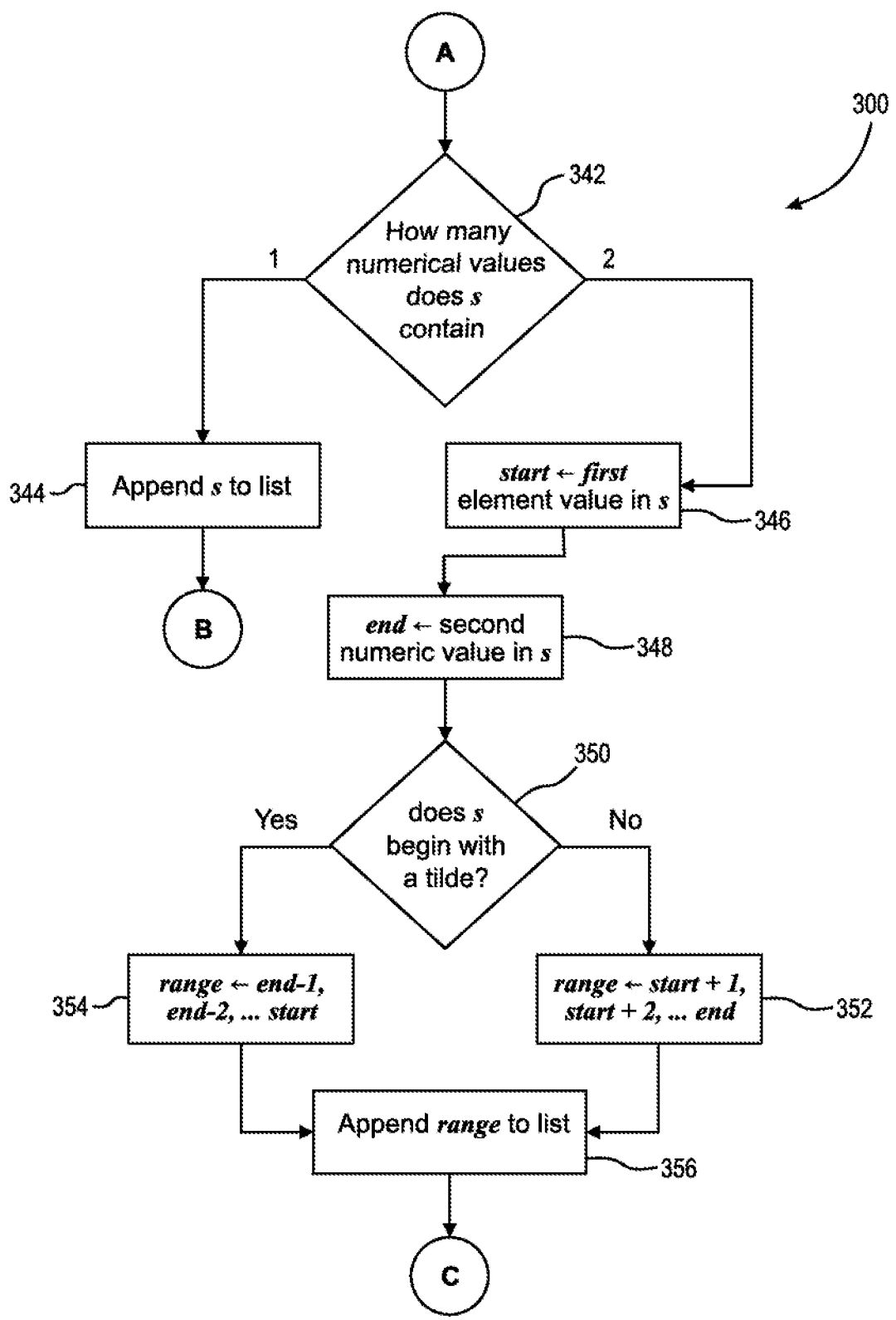
Figure 3C:
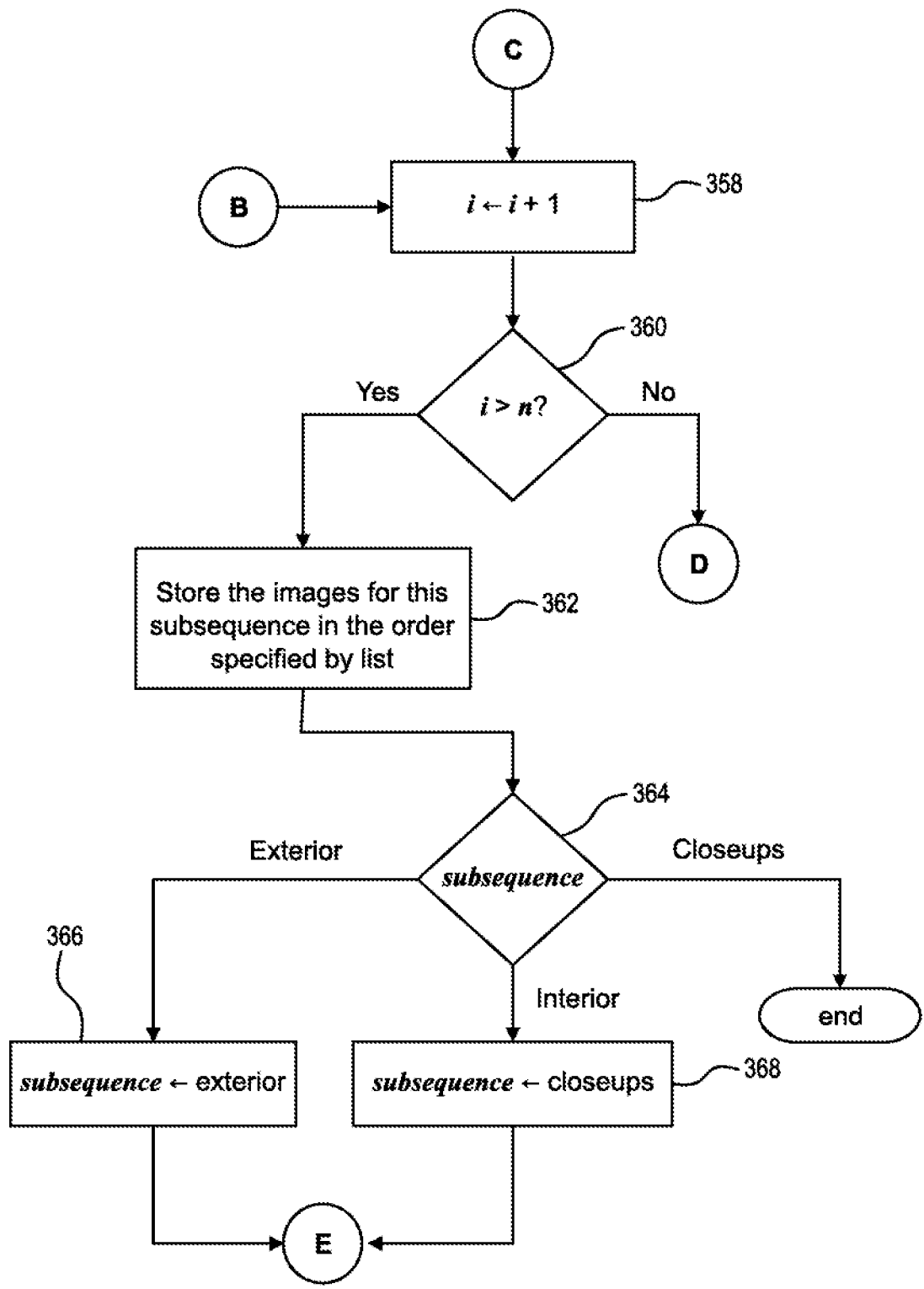

FIGS. 3A-3C are flow diagrams illustrating an example method 300 of automatically rearranging a plurality of images into at least one sequence that includes ordered images from a plurality of viewing angles, according to an example embodiment of the present invention. The example method 300 of FIGS. 3A-3C may be implemented in element 115 of FIG. 1 or element 240 of FIG. 2. The example method 300 of automatically rearranging the images may begin with downloading (305) the images, or they may already be downloaded. The first sequence may be an exterior sequence (310), which starts with an empty list (315). The example method obtains (320) a sequence string for the images, reads (325) the formatting for the string for the particular user, stores the string, and splits (330) the string at each delimiter (e.g., whitespace). Starting with the first substring (335, 340), it is determined (342) how many numerical values are in the substring. If the substring contains one numerical value, the substring is appended (344) to a list of indices. If the substring contains two numerical values, the first and second values are determined (346, 348), and it is further determined (350) whether the substring begins with a character indicating reverse order (e.g., a tilde "~"). If the substring does not begin with a character indicating reverse order, the range of indices is appended (352, 356) to the list in the order of the substring; however, if the substring begins with a character indicating reverse order, then the range of indices is appended (354, 356) to the list in the reverse order of the substring. If there are more substrings (358, 360), then the process (340-356) is repeated for each substring. If the substring was the last substring (358, 360), then the images indicated in the list of indices are stored as the sequence for the exterior sequence of images, and the process (320-362) is repeated for interior (366) and close-up (368) sequences.

Hotspots displayed in images of an interactive rotatable 360-degree presentation allow users to access additional media elements (e.g., close-up images, text descriptions, URLs and/or additional interactive rotatable 360-degree presentations) associated with specific features of the rotating object. A user (e.g., car dealer) can manually create hotspots for a particular 360-degree presentation; however, the resulting hotspots may apply only to the particular 360-degree presentation. Often, a user would like one or more hotspots to apply to all of their 360-degree presentations. These can be referred to as standard hotspots. Similarly, a user may wish one or more hotspots to apply to all of their 360-degree presentations that meet certain criteria. These can be referred to as conditional hotspots. An example use of a conditional hotspot by a car-dealer user could be to access a close-up image of the cargo area for all Ford vehicles. The addition of standard hotspots and conditional hotspots to 360-degree presentations is automated, in that a user, or other entity on the user's behalf, can define standard and conditional hotspots once, and the hotspots are then automatically applied to all applicable 360-degree presentations for that user.

To define a standard hotspot, a user may indicate a name for the hotspot, an optional text description, optional close-up image, optional URL, and the (x,y) coordinates of the hotspot on each image of the 360-degree presentation where it is visible. This information is stored in the configuration record for the user. To define a conditional hotspot, a user can create a hotspot as if the user were creating a standard hotspot, as above. The user can then make the hotspot a conditional hotspot based on certain criteria for a product. For example, in the case of vehicles, the hotspot may be conditional based on a vehicle's make or model.

The defined standard and conditional hotspots are automatically applied to a user's 360-degree presentations. While processing a user's feed file, the present embodiments identify a Vehicle Identification Number (VIN), in the case of vehicles for example, for which a 360-degree presentation is to be created. Any standard hotspot data is obtained from the user's configuration record, and the standard hotspot data is stored as part of the 360-degree view (e.g., in a JavaScript Object Notation (JSON)-formatted file). Any conditional hotspot data is obtained from the user's configuration record, and the conditional hotspot data is stored as part of the 360-degree presentation (e.g., in the JSON formatted file). The present embodiments may obtain additional data regarding the user's product (e.g., the vehicle's make and model) from the feed file and store the additional information in (e.g., in the JSON-formatted file). When a viewer views the resulting 360-degree presentation, the standard hotspot data, conditional hotspot data, and additional information (e.g., make and model) are read from the JSON-formatted file, for example. Upon displaying each image of the rotating 360-degree presentation, each hotspot that meets certain criteria is displayed. For example, if the hotspot is a standard hotspot and is visible on the current image, then the hotspot is displayed. If the hotspot is a conditional hotspot, is visible on the current image, and the vehicle's make or model is found in the conditional hotspot's definition of makes or models, then the hotspot is displayed.

The following is an example of hotspot data for two hotspots in JSON format:

particular user is selected (436), modified (438) with the hotspot definition data, and stored (440). When a new 360-degree presentation is created (442) for the user, the hotspot data stored in the configuration file for the user is applied (444) to the new 360-degree presentation, and the hotspot data is stored (446) with the new 360-degree presentation.

Figure 4A:
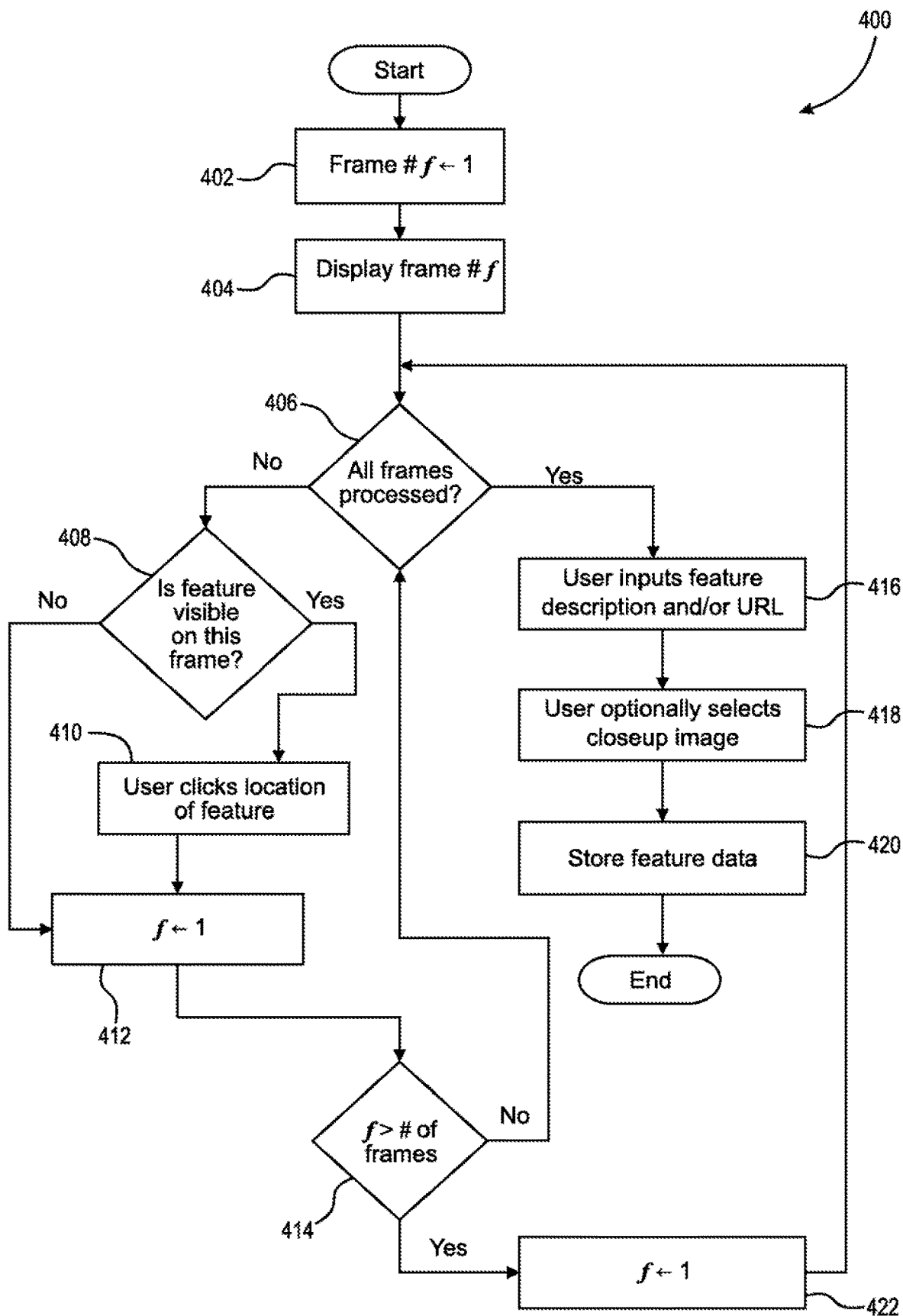
FIGS. 4A-4C are flow diagrams illustrating adding hotspot(s) to the image(s) and displaying the hotspot(s), according to an example embodiment of the present invention.
Figure 4B:
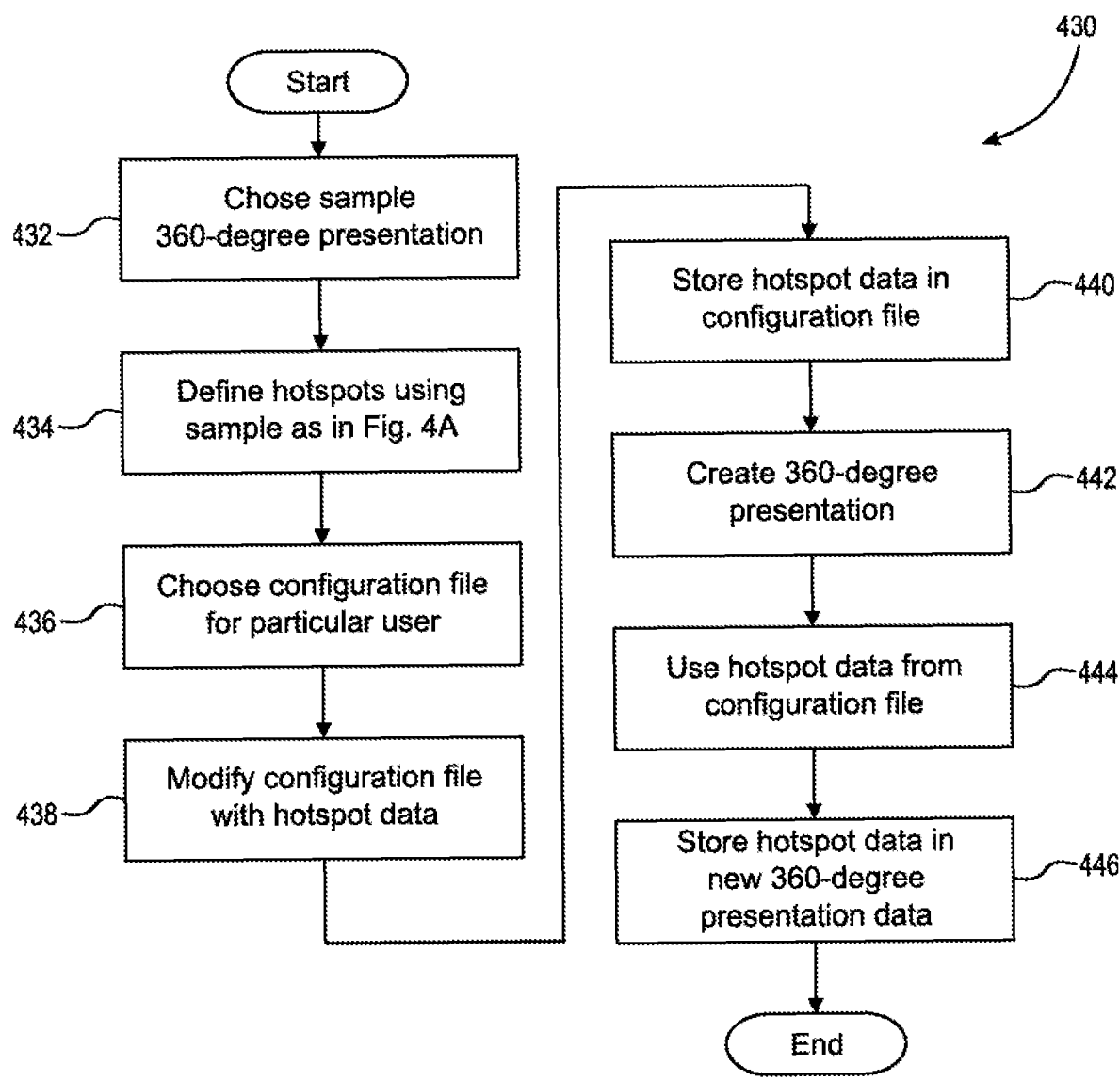
Figure 4C:
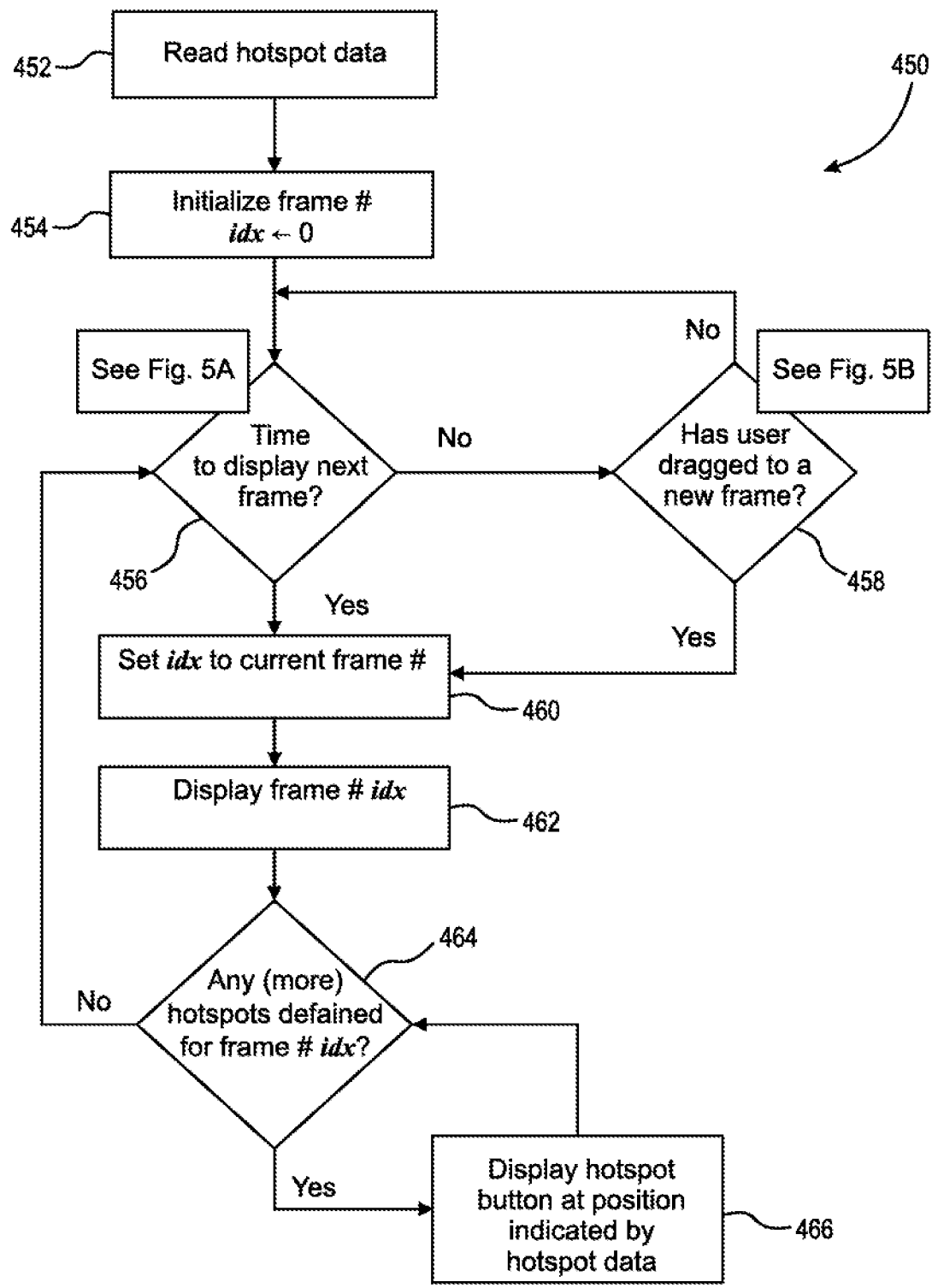

FIG. 4C illustrates an example method 450 of displaying hotspot(s) on image(s) of a sequence. According to the example method 450, hotspot data is read (452) for a particular 360-degree presentation, and the presentation is initialized (454). If it is determined that it is time to display a next image (456; see method 500 of FIG. 5A), then the image is displayed (460, 462), and if any hotspots are defined for the image (464), the hotspot(s) are displayed (466) on the image. If it is determined that it is not time to display the next image (456), then it is determined whether a viewer has selected to display another image (458; see method 530 of FIG. 5B). If a viewer has selected to display another image (458), then the image is displayed (460, 462), and if any hotspots are defined for the image (464), the hotspot(s) are displayed (466) on the image.

Once the images of the object have been obtained, resized if needed, and arranged in the proper sequence, the images are merged into one or more views of the object that are part of an interactive rotatable 360-degree presentation. One example way of merging the images is to create a folder on a server (e.g., an Amazon Simple Storage Service bucket configured as a static web server). The main folder's name may uniquely identify the object (e.g., for a vehicle, by using the vehicle identification number, such as "19uua86559a012993"). A subfolder named "img," for example, can be created in the main folder. A further ---
-- Example Hotspot Data --
{"i": [{"name": "Climate Control", "models": ["A4"], "url":
"http://www.audiusa.com/help/video-
tutorials#dtufilters/vehicleName/a4_cabriolet/vehicleTutorial/all/", "coords": [null,
[0.5225, 0.5622641509433962]], "closeup": -1, "makes": null, "description": ""},
{"name": "Concert Radio", "models": ["A4"], "url":
"http://s7d9.scene7.com/e2/Audiusastaging/Video/DTU/2014/Desktop/03_AUDI %20
DTU_CONCERT_RADIO_720p_Desktop.mp4", "coords": [null,
[0.4475,0.47924528301886793]], "closeup": -1, "makes": null, "description": ""}]}
-- End Example Hotspot Data --

---

FIGS. 4A-4C are flow diagrams illustrating adding hotspot(s) to image(s) in a sequence and displaying the hotspot(s), according to an example embodiment of the present invention. FIG. 4A illustrates an example method 400 of manually defining standard hotspots for images of one or more sequences. Starting with the first image (402, 404, 406), if the hotspot feature is to be visible on the image (408), a user selects (410) a location of the hotspot feature on the image, for example, by clicking using a mouse and monitor. The image is then advanced to the next image (412, 414), and other such locations are selected for each image on which the hotspot feature is visible (406-410). When all images have been processed (414, 422, 406), additional information is provided for the hotspot feature, including, for example, a text description, URL, or close-up image (416, 418). The information for the hotspot feature is then stored (420) for display within the 360-degree presentation.

FIG. 4B illustrates an example method 430 of automatically adding standard hotspots to images of one or more sequences. A sample 360-degree presentation for a particular user is selected (432), and hotspots may be defined (434) as in the method 400 of FIG. 4A. A configuration file for the subfolder under the "img" subfolder can be created for each view of the object (e.g., for a vehicle, subfolders named "ec" representing an exterior view with doors closed, and "i" representing an interior view). Additional further subfolders under "img" named "closeups" and "closeup_thumbs" may be created. The images for each view of the object are assigned filenames in the proper sequence (e.g., 0-0.jpg, 0-1.jpg, etc.). Close-up images are assigned filenames in the proper sequence (e.g., cu-0.jpg, cu-1.jpg, etc.). The images for each view are uploaded to the corresponding subfolders under "img" (e.g., to "img/ec" and "img/i"). The images for close-up photographs are uploaded to "img/closeups." Smaller versions of the close-up images, each with the same filename as the corresponding larger image, are uploaded to "img/closeup_thumbs." It should be appreciated that alternative directory and file names may be used.

An HTML file named "index.html" can be created in the main folder. This file redirects the user's web browser to a separate web page that includes HTML, JavaScript, and CSS code for displaying interactive rotatable 360-degree presentations. Upon redirection, URL parameters identify the location of the current presentation. The following is an example index.html file:

```
-- Example index.html File --
<script>location.href = "http://static.swipetospin.com/20140725/#http://" +
location.host + '/' + location.pathname.substring(location.pathname.charAt(0) ==
'/').replace('index.html', '') + '#nocache';</script>
-- End Example index.html File --
```

A JSON-formatted file named info.json can also be created in the main folder. This file contains data that controls the behavior of the interactive rotatable 360-degree presentation (e.g., speed of rotation, locations of hotspots, etc.). The following is an example info.json file:

```
-- Example info.json File --
{"make": "Acura", "vin": "19uua86559a012993", "options": {"refreshRate": 130, "skipI":
false, "viewerType": "vehicle", "features": {"i": [{"coords": [[0.22, 0.4325], null, null,
null, null, null, null, null, null, null, null, [0.52, 0.4325]], "closeup": 24, "description": "",
"name": "Mileage"}, {"coords": [[0.5166666666666667, 0.475], [0.13, 0.545], null, null,
null, null, null, null, null, null, null, [0.8166666666666667, 0.475]], "closeup": 25,
"description": "", "name": "Radio/navigation"}], "std": [ ], "eo": [ ], "ec": [{"coords":
[[0.5016666666666667, 0.675], [0.19166666666666668, 0.625], [0.16166666666666665,
0.5725], [0.14833333333333334, 0.525], null, null, null, null, null, null, null,
[0.6283333333333333, 0.635]], "closeup": 26, "description": "", "name": "Wheel"},
{"coords": [null, null, null, null, null, null, [0.88, 0.57], [0.8666666666666667, 0.6975],
[0.6666666666666666, 0.785], [0.4266666666666667, 0.785]], "closeup": 27,
"description": "", "name": "Tire tread"}, {"coords": [[0.7216666666666667, 0.395],
[0.4766666666666665, 0.465], [0.31166666666666665, 0.4475],
[0.22166666666666668, 0.4325], null, null, null, null, null, null, null,
[0.7716666666666666, 0.355]], "closeup": 28, "description": "", "name": "Driver-side
door (open)"}, {"coords": [null, null, [0.8766666666666667, 0.385],
[0.8083333333333333, 0.3775], [0.5016666666666667, 0.3575],
[0.20666666666666667, 0.3625], [0.14333333333333334, 0.3975]], "closeup": 29,
"description": "", "name": "Trunk"}, {"coords": [null, null, null, null, null,
[0.7766666666666666, 0.3725], [0.715, 0.43], [0.5383333333333333, 0.48],
[0.3383333333333333, 0.4425], [0.23833333333333334, 0.3675]], "closeup": 30,
"description": "", "name": "Passenger-side door (open)"}, {"coords":
[[0.19333333333333333, 0.505], null, null, null, null, null, null, null,
[0.8516666666666667, 0.5025], [0.7516666666666667, 0.495], [0.48, 0.515],
[0.2633333333333333, 0.475]], "closeup": 31, "description": "", "name": "Engine"}]},
"numImgEO": 0, "numImgI": 12, "watermark_position": 0, "feature_button_suffix": "",
"numImgStd": 0, "numImgEC": 12, "customCSS": "", "skipEO": true, "carousel": true,
"flickDecay": 0, "sizeW": 600, "invertRL": false, "uiColor": "#333333", "mouseOver":
false, "sizeH": 400, "contact_form": false, "imgH": 426, "numImgCloseup": 48, "ext":
".jpg", "imgW": 640}, "model": "TL", "walkaroundVersion": "20140725", "stock": ""}
-- End Example info.json File --
```

The following is an example directory tree for the folder containing images for an interactive rotatable 360-degree presentation, index.html file, and info.json file:

```
-- Example Directory Tree --
19uua86559a012993/
    index.html
    info.json
    img/
        closeup_thumbs/
            cu-0.jpg
            cu-1.jpg
            ...
            cu-47.jpg
        closeups/
            cu-0.jpg
            cu-1.jpg
            ...
            cu-47.jpg
        ec/
            0-0.jpg
            0-1.jpg
            ...
            0-11.jpg
        i/
            0-0.jpg
            0-1.jpg
            ...
            0-11.jpg
-- End Example Directory Tree --
```

Figure 5A:
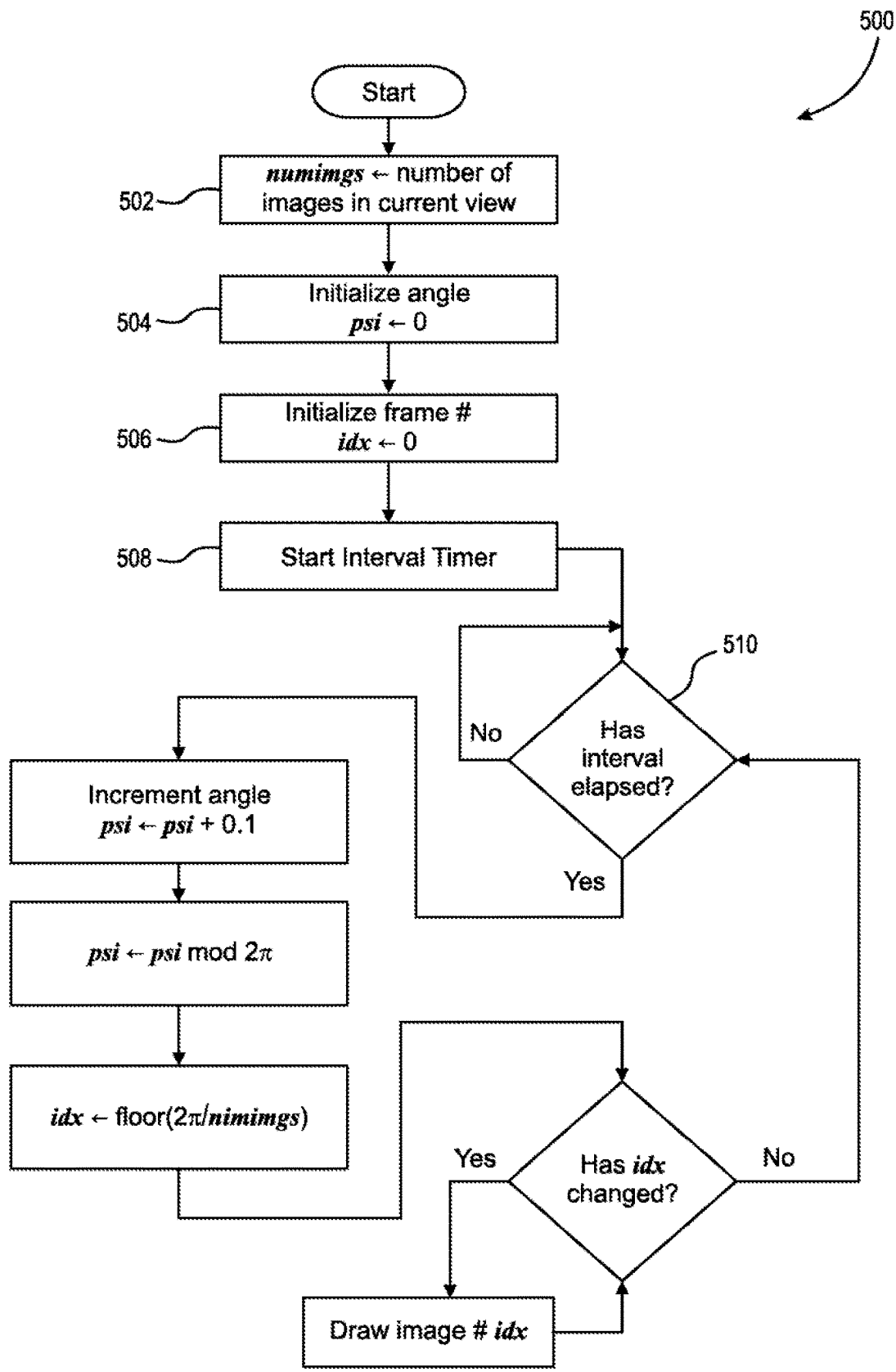
FIGS. 5A and 5B are flow diagrams illustrating rendering a rotation of the interactive rotatable 360-degree presentation of an object, according to an example embodiment of the present invention.
Figure 5B:
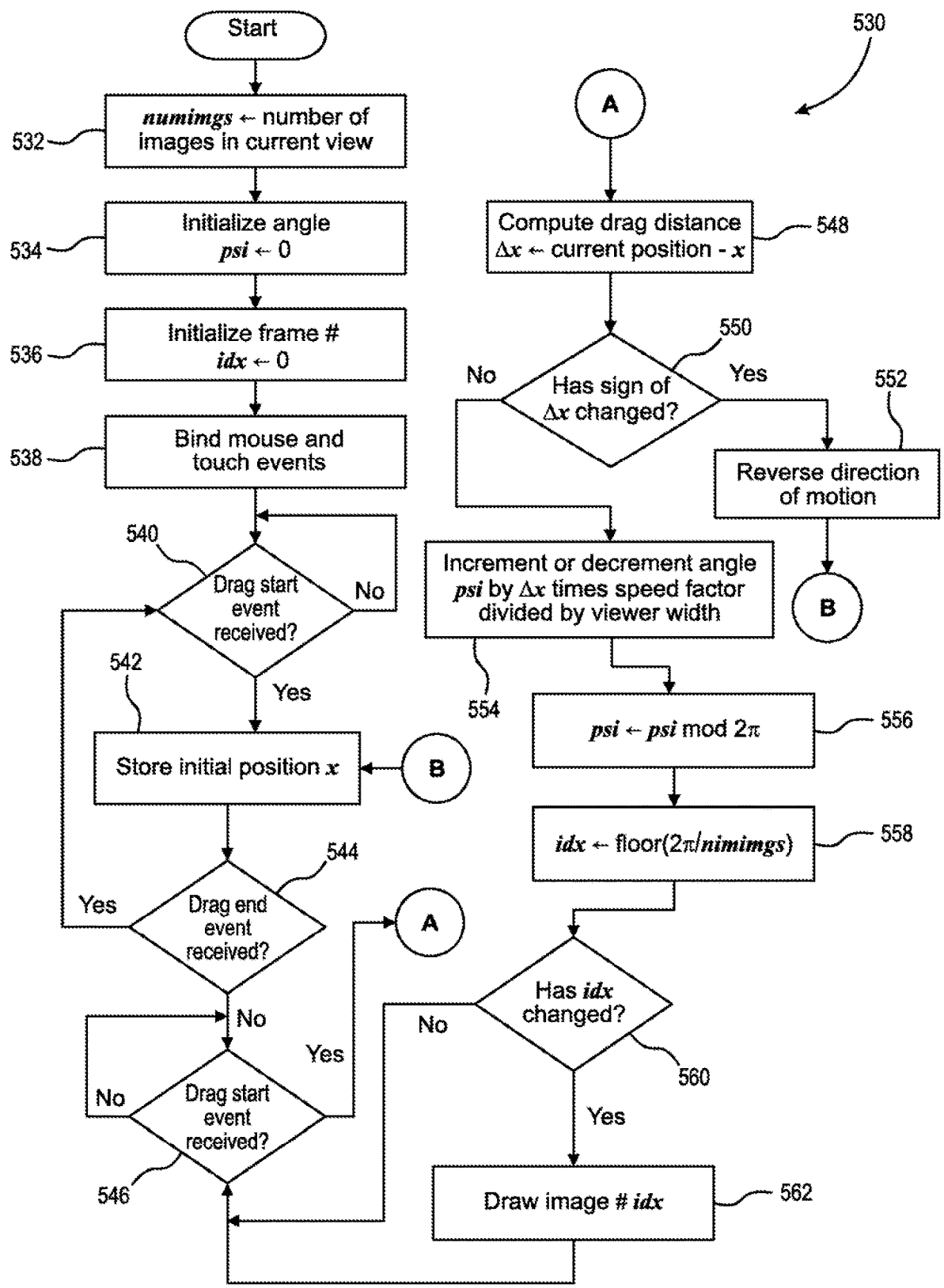

FIGS. 5A and 5B are flow diagrams illustrating rendering a rotation of the interactive rotatable 360-degree presentation of an object, according to an example embodiment of the present invention. When initially displayed, the 360-degree presentation may automatically rotate clockwise (see e.g., FIG. 5A), but a viewer can drag the 360-degree presentation using a mouse or touchscreen to manually rotate the presentation clockwise or counterclockwise (see e.g., FIG. 5B). In a case in which the 360-degree presentation includes both exterior and interior images, for example, an exterior view may initially be displayed. The viewer can click or tap an icon, for example, to switch to an interior view. As described in the above examples, hotspots can highlight specific features of the rotating object, and automatically follow the appropriate point on the object as it rotates. In addition, a "carousel" of images may display thumbnail images of selected details of the object.

FIG. 5A illustrates an example method 500 for automatic rotation of a 360-degree presentation. According to the example method 500, the 360-degree presentation is initialized to display the first image (502, 504, 506), and an interval timer is started (508). When an interval has elapsed (510), the next display angle for the 360-degree view is determined (512, 514, 516). If the next display angle results in the next image needing to be displayed (518), then the next image is displayed (520).

FIG. 5B illustrates an example method 530 for manual rotation of a 360-degree presentation. According to the example method 530, the 360-degree presentation is initialized to display the first image (532, 534, 536, 538). When a drag event is received (540), the initial x-position of the drag event is stored (542), and as the drag event progresses (544, 546), the distance of the drag is determined (548). As a viewer of the 360-degree presentation changes drag directions (550), the direction of the resulting rotation also changes (552). The next display angle for the 360-degree presentation is determined based on the drag distance (554, 556, 558), and if the next display angle results in the next image needing to be displayed (560), then the next image is displayed (562). The method repeats (546-562) upon receiving more drag events.

Figure 6:
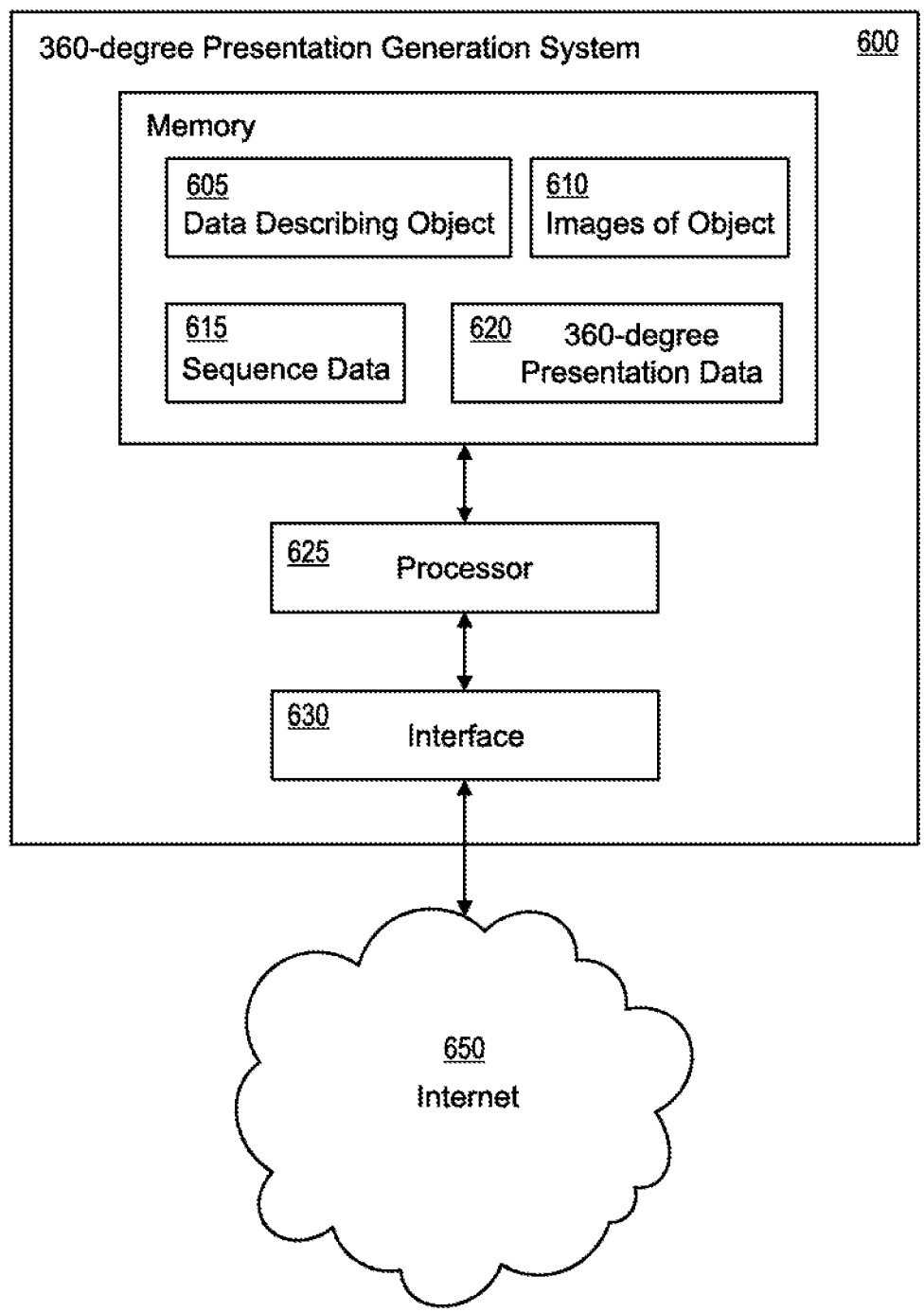
FIG. 6 is a block diagram illustrating a system for generating an interactive rotatable 360-degree presentation of an object, according to an example embodiment of the present invention.

FIG. 6 is a block diagram illustrating a system 600 for generating an interactive rotatable 360-degree presentation of an object, according to an example embodiment of the present invention. The example system 600 includes an interface 630 that obtains data describing the object 605 (e.g., from a source accessible by the Internet 650), where the data 605 includes information about images 610 of the object to be obtained and converted into the interactive rotatable 360-degree presentation 620 of the object, and additional information about the object. The interface 630 also obtains a plurality of images 610 of the object. The system further includes a processor 625 that automatically rearranges the plurality of images 610 into at least one sequence 615, where a sequence 615 includes ordered images from a plurality of viewing angles of the object substantially evenly distributed around 360 degrees. The processor 625 also automatically determines whether to add at least one hotspot to at least one image in the at least one sequence 615, and if the at least one hotspot is to be added, the processor 625 automatically adds the at least one hotspot to the at least one image. The processor 625 further automatically merges the ordered images of the at least one sequence 615 into at least one view of the object, and merges the at least one view into an interactive rotatable 360-degree presentation 620 of the object.

Figure 7:
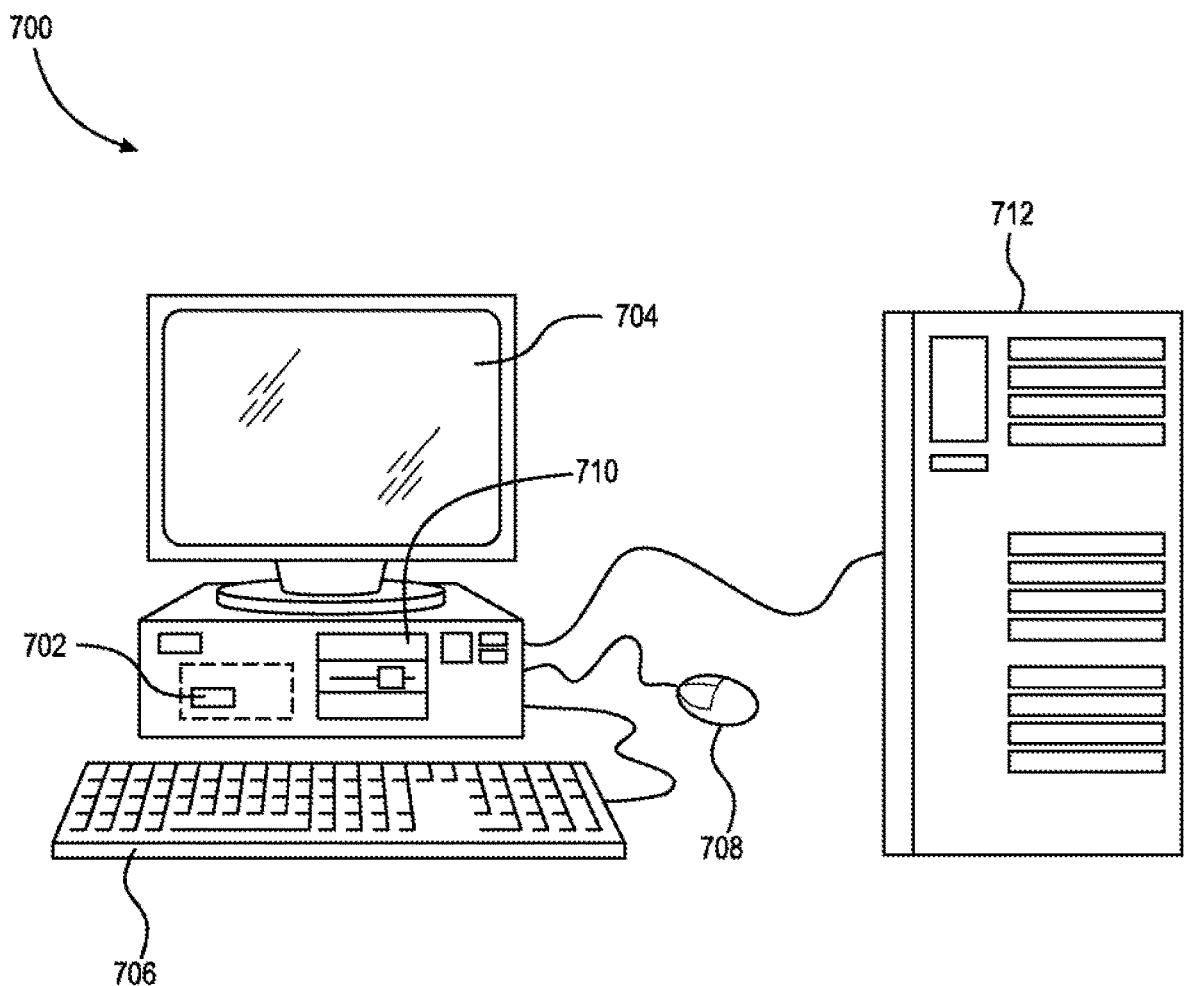
FIG. 7 is a schematic diagram of a computer system in which embodiments of the present invention may be implemented.

FIG. 7 is a schematic diagram of a computer system 700 in which embodiments of the present invention may be implemented. FIG. 7 illustrates a system 700 that includes a Central Processing Unit (CPU) 702, a computer monitor 704, a keyboard input device 706, a mouse input device 708, and a storage device 710. The CPU 702, computer monitor 704, keyboard 706, mouse 708, and storage device 710 can include commonly available computer hardware devices. For example, the CPU 702 can include an Intel or AMD based processor. The mouse 708 may have conventional left and right buttons that a user may press to issue a command to a software program being executed by the CPU 702. As an alternative or in addition to the mouse 708, the computerized system 700 can include a pointing device such as a trackball, touch-sensitive pad, or pointing device and buttons built into the keyboard 706. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 2000, Windows XP, Windows ME, Windows 7, 8, etc., UNIX, Linux, or MAC OS operating systems. The computerized system 700 may include network hardware and software, thereby enabling communication to a hardware platform 712, and facilitating communication between numerous computer systems that include a CPU and a storage system, among other computer components.

Software (e.g., processes 100, 200, 300, 400, 430, 450, 500, and 530 if implemented in software) may be stored on the storage device 710 and loaded into and executed by the CPU 702. The software allows a user to create and modify an interactive rotatable 360-degree presentation and implements aspects of the invention described herein. The CPU 702 uses the computer monitor 704 to display aspects thereof as described. Using the keyboard 706 and the mouse 708, a user can enter and modify data associated with the interactive rotatable 360-degree presentation. The CPU 702 accepts and processes input from the keyboard 706 and mouse 708. The CPU 702 processes the input along with the data associated with the interactive rotatable 360-degree presentation and makes corresponding and appropriate changes to that which is displayed on the computer monitor 704 as commanded by the software.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor, and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special-purpose microprocessors. Generally, a processor will receive instructions and data from a read-only memory and/or a random access memory, and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

An additional aspect of the disclosed methods and systems is that they allow for automated capture of analytics data. Users may receive analytics reports containing data such as: (1) the number of vehicle detail pages (VDPs) without 360-degree presentations viewed, and the time spent viewing these pages, (2) the number of VDPs with 360-degree presentations viewed, and the time spent viewing these pages, (3) hotspots that were clicked by users, and the time spent viewing the resulting media elements, and (4) the list of VDPs, 360-degree presentations and hotspots viewed by a particular viewer who has submitted a contact request form to the user (e.g., car dealer). In order to include 360-degree presentations on their websites, users (e.g., car dealers) may, for example, add a script tag (an HTML tag that loads JavaScript code) to their VDPs. Due to the presence of this script tag, the present embodiments may capture data to support analytics reports. The user (e.g., car dealer) doesn't need to take any action to enable this data capture; the data is fully automated.

An example data capture process may work as follows: The present embodiments' JavaScript code inserts an HTML iframe tag into the VDP. This is the analytics iframe. The JavaScript detects whether a 360-degree presentation is available. If so, the JavaScript code inserts a second HTML iframe tag into the VDP. This is the 360-degree presentation iframe. Within each of the iframes, the JavaScript code makes an HTTP request to an analytics server associated with the present embodiments. The analytics server hosts a web application that listens and responds to HTTP requests. In response to each HTTP request, the web application creates or updates a record in the analytics database. These records are the basis for analytics reports.

Each HTTP request contains data such as: (1) a unique alphanumeric identifier that anonymously identifies each individual viewer, (2) the event that occurred, one of: viewing a VDP, viewing a 360-degree presentation, viewing a feature via clicking a hotspot or carousel thumbnail, ceasing to view a feature, or leaving the page, (3) descriptive data associated with the event, such as the URL of the page visited, the VIN of the vehicle displayed in a 360-degree presentation, or the name of the feature viewed, or (4) the time at which the event occurred.

While this invention has been particularly shown and described with references to example embodiments thereof, it will be understood by those skilled in the art that various changes in form and details may be made therein without departing from the scope of the invention encompassed by the appended claims. For example, while the foregoing examples have been described in the context of car dealers and vehicles, it should be appreciated that the present embodiments can be used in any industry where it is desirable to create 360-degree presentations of objects.

What is claimed is:

1. A system for generating an interactive rotatable 360-degree presentation of a first object, the system comprising:
    an interface configured to:
        obtain data describing the first object, the data describing the first object contained in a record and arranged in at least one row and at least one column, the record including additional data describing at least one additional object, the data describing the first object including information about a plurality of arranged images of the first object to be obtained and converted into the interactive rotatable 360-degree presentation of the first object, and additional information about the first object, the additional information about the first object including at least one of a vehicle make, a vehicle model, a vehicle identification number, or a vehicle body style; and
        obtain, responsive to obtaining the data describing the first object, the plurality of arranged images of the first object; and
    a processor configured to:
        automatically rearrange the plurality of arranged images into at least one sequence, the at least one sequence including ordered images from a plurality of viewing angles of the first object distributed around 360 degrees;
        automatically determine whether to add at least one hotspot to at least one image in the at least one sequence, and if the at least one hotspot is to be added, automatically add the at least one hotspot to the at least one image, the at least one hotspot enabling access to a separate media element when selected by a viewer of the interactive rotatable 360-degree presentation of the first object; and
        automatically merge the ordered images of the at least one sequence into at least one interactive rotatable 360-degree view of the first object, the at least one interactive rotatable 360-degree view comprising at least one of an exterior view of the first object and an interior view of the first object.

2. The system of claim 1, wherein automatically rearranging the plurality of arranged images comprises:
    selecting at least one image from the plurality of arranged images that correspond to the exterior view of the first object for inclusion in a first sequence of the at least one sequence, and
    selecting at least one image from the plurality of arranged images that correspond to the interior view of the first object for inclusion in a second sequence of the at least one sequence.

3. The system of claim 2, wherein automatically rearranging the plurality of arranged images comprises rearranging the plurality of arranged images into at least one of the first sequence and the second sequence.

4. The system of claim 1, wherein the processor is further configured to display the at least one interactive rotatable 360-degree view.

5. The system of claim 1, wherein the processor is further configured to:
    receive a user input selecting the at least one hotspot; and
    display, in response to the user input, the separate media element.

6. The system of claim 1, wherein the interface is further configured to extract at least one of the plurality of arranged images from a video file.

7. The system of claim 1, wherein the separate media element comprises any of text, an additional image, a video, a web page link, and an additional interactive rotatable 360-degree presentation.

8. The system of claim 1, wherein the information about the plurality of arranged images comprises an image uniform resource locator.

9. The system of claim 1, wherein the processor is further configured to resize the plurality of arranged images to a common size.

10. The system of claim 1, wherein the interactive rotatable 360-degree presentation comprises the interior view of the first object and the exterior view of the first object.

11. The system of claim 1, wherein automatically adding the at least one hotspot to the at least one image comprises determining a position for the at least one hotspot on the at least one image.

12. The system of claim 1, wherein automatically rearranging the plurality of arranged images comprises determining an order for the plurality of arranged images.

13. The system of claim 1, wherein the plurality of arranged images comprises an arbitrary arrangement of the plurality of arranged images.

14. The system of claim 1, wherein the at least one sequence including the ordered images from the plurality of viewing angles of the first object are evenly distributed around 360 degrees.

15. The system of claim 1, wherein the at least one sequence including the ordered images from the plurality of viewing angles of the first object are substantially evenly distributed around 360 degrees.

16. The system of claim 2, wherein the at least one image from the plurality of arranged images that corresponds to the interior view of the first object comprises a panoramic image.

17. A computer implemented method, the method comprising:
obtaining data describing a first object, the data describing the first object contained in a record and arranged in at least one row and at least one column, the record including additional data describing at least one additional object, the data describing the first object including information about a plurality of arranged images of the first object to be obtained and converted into an interactive rotatable 360-degree presentation of the first object, and additional information about the first object, the additional information about the first object including at least one of a vehicle make, a vehicle model, a vehicle identification number, or a vehicle body style;
obtaining, responsive to obtaining the data describing the first object, the plurality of arranged images of the first object;
automatically rearranging the plurality of arranged images into at least one sequence, the at least one sequence including ordered images from a plurality of viewing angles of the first object distributed around 360 degrees;
adding at least one hotspot to at least one image in the at least one sequence, the at least one hotspot enabling access to a separate media element when selected by a viewer of the interactive rotatable 360-degree presentation of the first object; and
automatically merging the ordered images of the at least one sequence into at least one interactive rotatable 360-degree view of the first object, the at least one interactive rotatable 360-degree view including at least one of an exterior view of the first object and an interior view of the first object.

18. The computer-implemented method as in claim 17, further comprising displaying the at least one interactive rotatable 360-degree view on a user interface.

19. The computer-implemented method as in claim 17, further comprising automatically resizing the plurality of arranged images such that the plurality of arranged images are a common size for the interactive rotatable 360-degree presentation.

20. A non-transitory computer-readable storage medium including instructions which when executed by at least one processor causes operations comprising:
obtaining data describing a first object, the data describing the first object contained in a record and arranged in at least one row and at least one column, the record including additional data describing at least one additional object, the data describing the first object including information about a plurality of arranged images of the first object to be obtained and converted into an interactive rotatable 360-degree presentation of the first object, and additional information about the first object, the additional information about the first object including at least one of a vehicle make, a vehicle model, a vehicle identification number, or a vehicle body style;
obtaining, responsive to obtaining the data describing the first object, the plurality of arranged images of the first object;
automatically rearranging the plurality of arranged images into at least one sequence, the at least one sequence including ordered images from a plurality of viewing angles of the first object distributed around 360 degrees;
adding at least one hotspot to at least one image in the at least one sequence, the at least one hotspot enabling access to a separate media element when selected by a viewer of the interactive rotatable 360-degree presentation of the first object; and
automatically merging the ordered images of the at least one sequence into at least one interactive rotatable 360-degree view of the first object, the at least one interactive rotatable 360-degree view including at least one of an exterior view of the first object and an interior view of the first object.

* * * * *